United States Patent [19]

McMichael et al.

[11] Patent Number: 5,539,198
[45] Date of Patent: Jul. 23, 1996

[54] UNIFORM SENSITIVITY LIGHT CURTAIN

[75] Inventors: Ian McMichael, Port Hueneme; Mohen Khoshnevisan, Newberry Park, both of Calif.

[73] Assignee: Rockwell International Corporation, Troy, Mich.

[21] Appl. No.: 128,624

[22] Filed: Sep. 28, 1993

[51] Int. Cl.⁶ .............................. H01J 40/14; G06M 7/00; G02B 26/00
[52] U.S. Cl. ................ 250/221; 250/223 B; 250/227.26; 250/227.28; 250/208.2
[58] Field of Search ................................ 250/223 B, 221, 250/227.26, 227.28, 208.2, 560, 573

[56] References Cited

U.S. PATENT DOCUMENTS

| | | | |
|---|---|---|---|
| 3,970,846 | 7/1976 | Schofield, Jr. et al. | 250/221 |
| 4,029,957 | 6/1977 | Betz et al. | 250/221 |
| 4,402,609 | 9/1983 | Fetzer et al. | 250/237 G |
| 4,431,309 | 2/1984 | Sick et al. | 250/572 |
| 4,864,121 | 9/1989 | Pietzsch | 250/221 |
| 4,875,761 | 10/1989 | Fetzer | 350/171 |
| 4,893,120 | 1/1990 | Doering et al. | 250/221 |
| 5,008,530 | 4/1991 | Ball | 250/221 |
| 5,015,840 | 5/1991 | Blau | 250/221 |
| 5,080,457 | 1/1992 | Fetzer et al. | 359/208 |

FOREIGN PATENT DOCUMENTS 62-093681 3/1987 Japan .

*Primary Examiner*—William L. Sikes
*Assistant Examiner*—Fetsum Abraham

[57] ABSTRACT

A light curtain having linearly arranged pairs of light transmitting and receiving which may be placed on opposing sides of a zone to be protected. The light curtain provides uniform sensitivity across the region to be protected as the light transmitters emit a light beam which begins as an omnidirectional point source which is truncated and refocused by an optical lense. Predetermined portions of the beam are blocked to assure uniform intensity across the width of the transmitter.

11 Claims, 4 Drawing Sheets

UNIFORM SENSITIVITY LIGHT CURTAIN

BACKGROUND OF THE INVENTION

FIELD OF THE INVENTION

The present invention relates to light curtains and, more specifically, to a light curtain which is capable of detecting objects with uniform sensitivity at any location across the width of the zone to be protected.

DESCRIPTION OF THE RELATED ART

Light curtains are employed in a variety of applications to sense the intrusion of objects in or around a prescribed area for operator protection around machinery and the like. Conventional light curtains employ infrared light beams which project across an area to be protected. Unintended intrusions of the light beams by an object such as an operator's hand are sensed by a circuit and trigger a warning signal and/or implement a protective action. Conventional light curtain displays employ a series of light emitting diodes paired with photo diodes to provide a grid. Sensitivity of such a system between the locations of the diodes is poor necessitating an increase in the quantity of diodes to accomplish a higher level sensitivity. An object of the present invention is to provide a sensitive light curtain while utilizing a minimum number of diodes.

SUMMARY OF THE PRESENT INVENTION

The present invention is a light curtain having linearly arranged pairs of light transmitters and receivers which may be placed on opposing sides of a zone to be protected. The light curtain provides uniform sensitivity across the region to be protected as the light transmitters emit a light beam which begins as an hemispherical point source which is truncated and refocused by an optical lens. Predetermined portions of the beam are blocked to assure uniform intensity across the width of the transmitter.

A receiver acting in combination with the transmitter provides an optical lens to focus the light beam on a photo diode. Uniformity of a light beam intensity is further enhanced by blocking portions of the light beam at the receiver. Indicia of an intrusion of the zone to be protected is provided by a reduction of light incident on the photo transistor below a predetermined threshold.

These and other aspects of the present invention will become more readily apparent by reference to the following detailed description of the embodiments as shown in the drawings.

DETAILED DESCRIPTION OF THE PREFERRED EMBODIMENT

Figure 1:
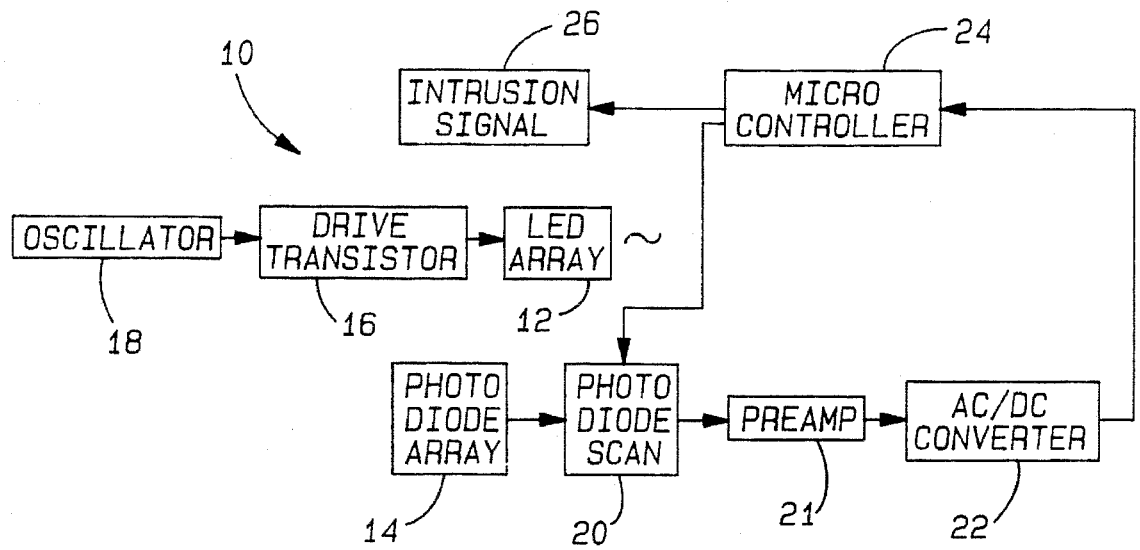
FIG. 1 is a block diagram of the components of the present invention.

The preferred embodiment of the present invention comprises a light curtain 10 which is the region physically extending from light emitting diode (LED) array 12 to photo diode array 14, as shown in FIG. 1. LED array 12 provides a light source or beam in response to 40 KHz modulated power supplied by drive transistor 16 and oscillator 18. LED array 12 comprises a series of light emitting diodes arranged in a linear sequence to preferably define a beam across the region to be monitored. Photo diode array 14 comprises a series of photo diodes arranged in a linear sequence each preferably associated with a respective light emitting diode of LED array 12. Each photo diode produces an electrical signal having a magnitude which is proportional to the amount light incident thereon. Each photo diode is sequentially sampled to provide an output from array 14 comprising a sequentially occurring sampling of the signal produced by each photo diode. The signal produced by photo diodes of array 14 is then amplified by preamp 20 and subsequently converted to a direct current (i.e., an amplitude) by conversion in an alternating current to direct current converter. A comparison is then performed in microcontroller 24 with a reference value to determine if a physical object has intruded light curtain 10. Upon such an incidence an intrusion detection indication will be provided at output 26 of microcontroller 24.

Figure 2:
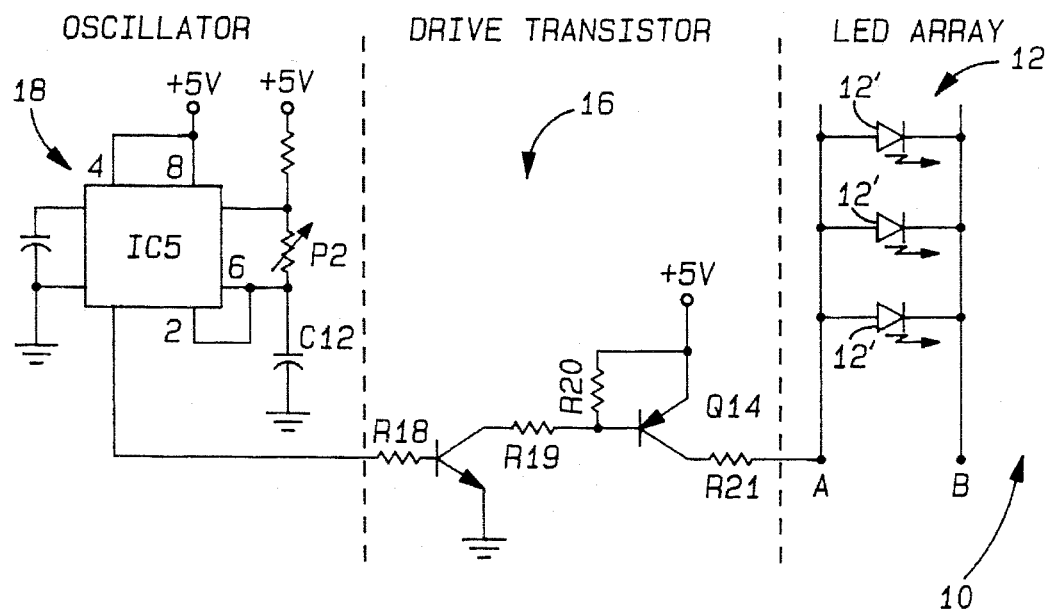
FIG. 2 is a schematic diagram of the light emitting diode array of the present invention.

The first circuit portion of light curtain 10 comprises an LED array 12 which is shown in FIG. 2. The array comprises a series of LEDs 12' arranged along parallel busses A and B as shown. Drive transistor Q14 provides a 40 KHz signal to LED array 12 in response to oscillator 18. Oscillator 18 utilizes IC5 which is a LM555.

Figure 3:
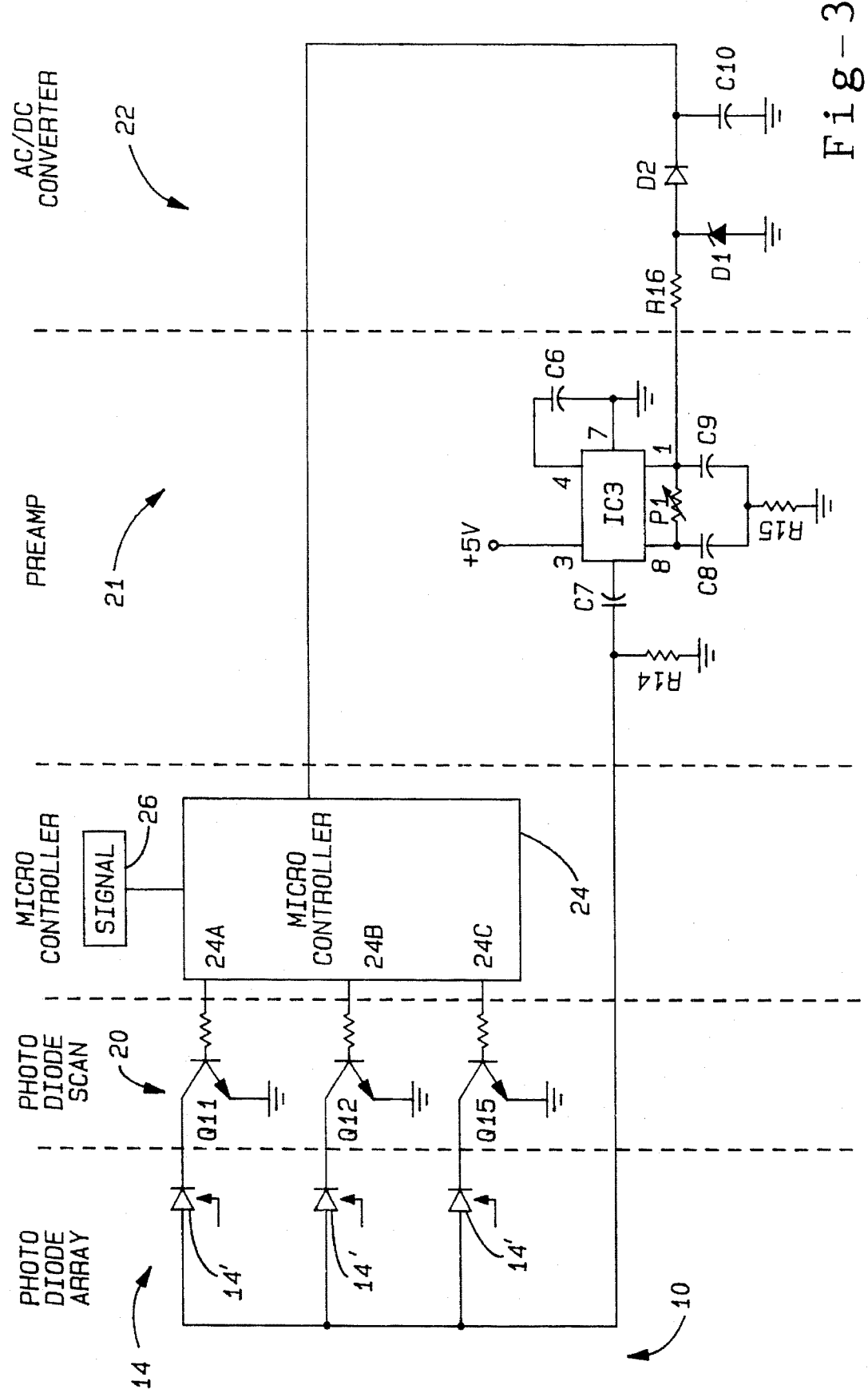
FIG. 3 is a schematic diagram of the photo diode and voltage comparison portion of the present invention.

The second circuit portion of light curtain 10, as shown in FIG. 3, comprises a photo diode array 14 shown as a respective array of photo diodes 14', each illuminated by a light emitting diode of array 12. Sequentially generated outputs 24A, 24B, 24C of microcontroller 24 sequentially gate a respective transistor sequentially completing a ground path to respective photo diodes of array 14, thereby providing a continuously repeating sampling of individual photo diodes of photo diode array 14. Preamplifier 21 comprises an IC3 chip, which is preferably a Telefunken 2507. Ideally, the preamplifier is tuned to produce a narrow band amplification in the region of 40 KHz, thereby minimizing the effect of noise and sunlight on the system. The output of preamplifier 21 is then converted to direct current (i.e., an amplitude signal) which is then supplied to an input of microcontroller 24. Microcontroller 24 performs a compare function to determine the magnitude of the amplitude signal in comparison with a reference value. The magnitude of the amplitude signal will provide an indication of the presence of an obstruction in light curtain 10 when the detected signal falls below the reference value. Upon detection of an obstruction an output signal is produced by microcontroller 24 at output 26 indicating the presence of an intrusion.

Figure 4:
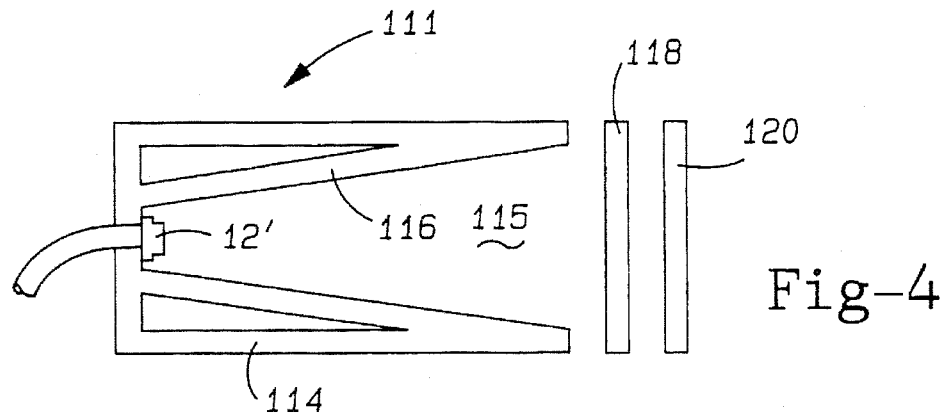
FIG. 4 is a side view, exploded and in cross section of the transmitter assembly of the present invention.
Figure 5:
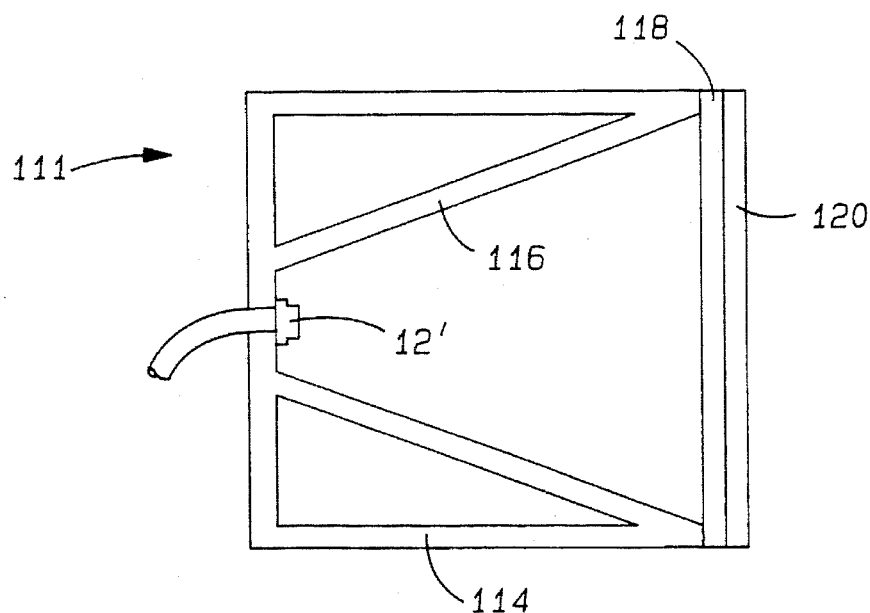
FIG. 5 is a top view in cross section of the transmitter assembly of the present invention.
Figure 6:
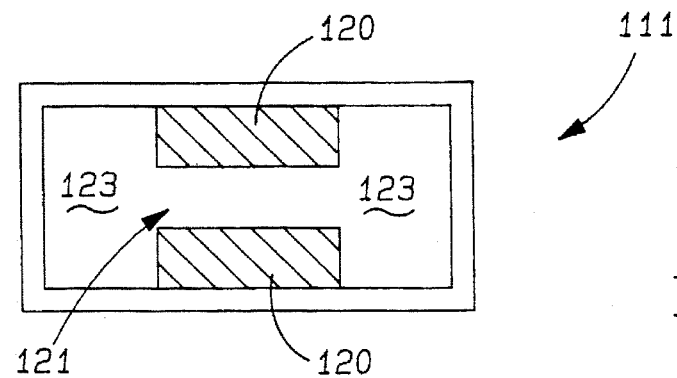
FIG. 6 is a front view of the transmitter assembly of the present invention.
Figure 7:
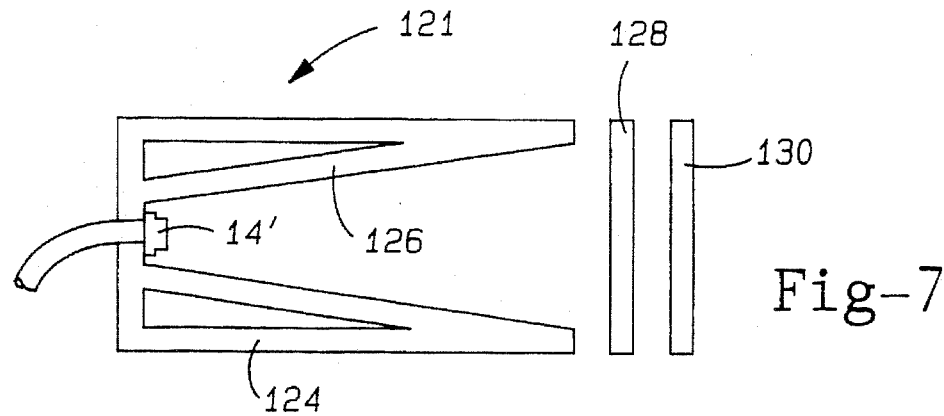
FIG. 7 is a side view, exploded and in cross section of the receiver assembly of the present invention.
Figure 8:
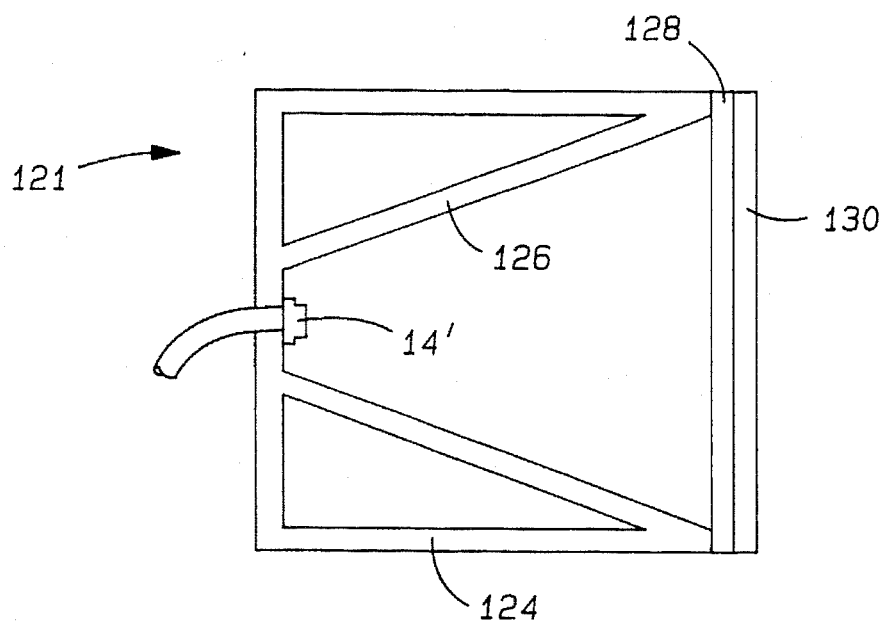
FIG. 8 is a top view in cross section of the receiver assembly of the present invention.
Figure 9:
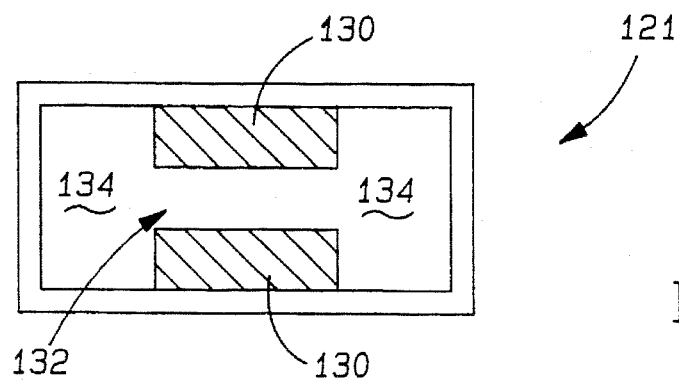
FIG. 9 is a front view of the receiver assembly of the present invention.

The LED array 12 is preferably contained within a transmitter assembly 111 as shown in FIGS. 4–6. Each transmitter assembly 111 includes a single LED 12' located in transmitter housing 114 which includes a light truncator 116. Light truncator 116 modifies the omnidirectional point source of the light from diode 12' by blocking selected portions thereof and only allowing light to pass through a predetermined aperture 115 thereof. The non truncated light is then modified by a frensel lense 118 acting in combination with a transmitter mask 120. The beam provided by LED 12' is therefore broadcast across the region to be protected and then falls incident upon receiver assembly 121 shown in FIGS. 7–9. Receiver assembly 121 includes a receiver housing 124 which features a photo diode 14' located at the apex of truncator 126. Frensel lense 128 is provided to focus the beam preferably toward the location of photo diode 14'. Mask 130 is shaped to block certain portions of the beam and therefore provide uniform sensitivity to obstruction over the entire width of the zone to be protected.

In the preferred embodiment of the present invention, light curtain 10 is formed by a series of linearly arranged opposing transmitter/receiver assemblies 111, 121. Mask 120 restricts the intensity of light emitted by transmitter 114 by providing a narrow center slit acting in conjunction with unimpeded end portions which permit unrestricted passage of light beams. Likewise, mask 130 accomplishes the same objective. Without masking, sensitivity can be nonuniform due to several factors including, the directional characteristics of the emitters and detectors, and edge effects (i.e., when an object is located half-way inbetween a pair of detectors the signal is half that when the same object is located in front of one of the detectors). With masking, it is possible to compensate for nonuniformities, resulting in uniform sensitivity. In the preferred embodiment of the present invention, masks 120, 130 may act in conjunction or, in the alternative, individually and preferably block predetermined portions of light beams including a central portion having only a central opening 121, 132 extending thereacross and opposed end openings 123, 134 respectively remaining unblocked permitting light beams to pass unrestricted therethrough. In this manner a uniform intensity and consequent uniform sensitivity may be accomplished at any location across the entire width of the light curtain.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A light curtain for detecting intrusion of a zone to be protected, comprising:

an omnidirectional light source providing a first collection of light beams radiating through a first truncator defined by an aperture having a first height and a first width;

means for optically redirecting said light beams to form a second collection of light beams radiating substantially parallel to one another;

masking means to selectively block portions of said second collection of light beams to form a third collection of light beams, said third collection of light beams characterized by uniform intensity light beams;

means to detect the intensity of said third collection of light beams incident upon a second aperture defined by a second height and a second width, said second aperture being disposed a predetermined distance from said light source; and means to provide an indicia of an intrusion upon detection of said intensity of said third collection of light beams falling below a predetermined intensity threshold.

2. The invention of claim 1, wherein said first aperture is defined by a structure which blocks radiation of light beams from said omnidirectional light source at all regions except predetermined regions.

3. The invention of claim 1, wherein said means for optically redirecting said light beams is a frensel lens.

4. The invention of claim 1, wherein said omnidirectional light source is a light emitting diode.

5. The invention of claim 1, wherein said means to detect the intensity of said third collection of light beams is a photo transistor acting in combination with a means for measuring voltage, said photo transistor producing a voltage representative of the intensity of said third collection of light beams.

6. The invention of claim 5 wherein said means to provide indicia of an intrusion comprises a voltage comparator performing a comparison of said voltage produced by said photo transistor with a threshold voltage said voltage comparator producing a comparison signal when said voltage providing by said photo transistor falls below said threshold voltage.

7. The invention of claim 1, wherein said masking means to selectively block portions of said second collection of light beams comprises a first mask disposed for blocking predetermined portions of said first aperture, said first mask including a central portion which is substantially blocked defining a central opening extending thereacross which provides blocking of said second collection of light beams as said light beams pass therethrough, said first mask further including opposed end portions which remain unblocked permitting said second collection of light beams to pass unimpeded therethrough.

8. The invention of claim 1, wherein said means to detect the intensity of said third collection of light beams comprises:

a means to optically redirect said light beams incident upon said second aperture to a third aperture defined by a third height and a third width, and a photo transistor disposed in said third aperture, said photo transistor suitable for producing a voltage responsive to an indicative of the intensity of said third collection of light beams, wherein the voltage produced by said photo transistor is compared to a predetermined threshold voltage by a voltage comparator.

9. The invention of claim 8, further including a second mask disposed for blocking predetermined portions of said second aperture, said second mask including a central portion which is substantially blocked defining a central opening extending thereacross and said second mask further including opposed end portions which remain unblocked permitting light beams to pass unimpeded therethrough.

10. A light curtain for detecting intrusion of a zone to be protected comprising:

an omnidirectional light source providing a first collection of light beams radiating through a first aperture defined by a first height and a first width;

said first aperture being defined by a structure which blocks radiation of light beams from said omnidirectional source at all regions except predetermined regions, said predetermined regions allowing passage of said first collection of light beams radiate through said first aperture;

means for optically redirecting said first collection of light beams to form a second collection of light beams radiating substantially parallel to one another;

a first mask disposed for blocking predetermined portions of said first, said first mask including a central portion which is substantially blocked defining a central opening extending thereacross which provides blocking of said second collection of light beams as said light beams pass therethrough, said first mask further including opposed end portions which remain unblocked permitting said second collection of light beams to pass unimpeded therethrough;

means to detect the intensity of said second collection of light beams incident upon a second aperture defined by a second height and a second width, said second aperture disposed a predetermined distance from said omnidirectional light source wherein said intensity detection means comprises a means to optically redirect said light beams incident on said second aperture to a third aperture defined by a third height and a third width and wherein said intensity detection means further comprises a photo transistor disposed in said third aperture, said photo transistor suitable for producing a voltage proportioned to the amount of light incident thereon; and means to provide an indicia of an intrusion when said photo transistor voltage is less than a predetermined threshold voltage.

11. The invention of claim 10 further including a second mask disposed for blocking predetermined portions of said second aperture, said second mask including a central portion which is substantially blocked defining a central opening extending thereacross which provides blocking of said second collection of light beams as said light beams pass therethrough, said second mask further including opposed end portions which remain unblocked permitting said second collection of light beams to pass unimpeded therethrough.

* * * * *